(12) United States Patent
Shimada et al.

(10) Patent No.: US 9,305,678 B2
(45) Date of Patent: Apr. 5, 2016

(54) COMPOSITION FOR WIRE COATING MEMBER, INSULATED WIRE, AND WIRING HARNESS

(75) Inventors: Tatsuya Shimada, Yokkaichi (JP); Yukihiro Sakamoto, Yokkaichi (JP); Masashi Sato, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/636,221

(22) PCT Filed: Apr. 1, 2011

(86) PCT No.: PCT/JP2011/058394
§ 371 (c)(1),
(2), (4) Date: Sep. 20, 2012

(87) PCT Pub. No.: WO2011/125924
PCT Pub. Date: Oct. 13, 2011

(65) Prior Publication Data
US 2013/0008691 A1    Jan. 10, 2013

(30) Foreign Application Priority Data
Apr. 5, 2010   (JP) ................................. 2010-087030

(51) Int. Cl.
*H01B 3/28* (2006.01)
*H01B 3/30* (2006.01)
*C08L 23/12* (2006.01)
*C08L 23/08* (2006.01)
*C08K 3/00* (2006.01)
*C08K 5/00* (2006.01)
*C08L 23/10* (2006.01)
*H01B 3/44* (2006.01)
*H01B 7/295* (2006.01)
*C08L 21/00* (2006.01)
*C08L 23/16* (2006.01)
*C08K 3/22* (2006.01)
*C08K 5/03* (2006.01)
*C08K 5/378* (2006.01)
*C08K 3/30* (2006.01)

(52) U.S. Cl.
CPC . *H01B 3/28* (2013.01); *C08L 23/10* (2013.01); *H01B 3/441* (2013.01); *H01B 7/295* (2013.01); *C08K 3/22* (2013.01); *C08K 5/005* (2013.01); *C08K 5/0066* (2013.01); *C08K 5/03* (2013.01); *C08K 5/378* (2013.01); *C08K 2003/3036* (2013.01); *C08L 21/00* (2013.01); *C08L 23/16* (2013.01)

(58) Field of Classification Search
CPC ........... C08L 23/10; C08L 21/00; H01B 3/28; H01B 3/441; H01B 7/295
USPC ........... 174/110 R, 120 C; 427/117; 524/436, 524/448, 375, 384; 525/263
See application file for complete search history.

(56) References Cited

U.S. PATENT DOCUMENTS

| | | | | |
|---|---|---|---|---|
| 3,480,580 A * | 11/1969 | Joyner et al. | ................... | 525/263 |
| 3,968,074 A * | 7/1976 | Schwarze et al. | ............. | 524/381 |
| 4,501,843 A * | 2/1985 | Needham | ....................... | 524/445 |
| 4,560,719 A * | 12/1985 | Nakamura et al. | ............ | 524/269 |
| 5,241,880 A * | 9/1993 | Mizobata et al. | ............. | 74/502.5 |
| 6,197,864 B1* | 3/2001 | Borke et al. | ................... | 524/436 |
| 6,646,205 B2* | 11/2003 | Hase et al. | ................ | 174/110 R |
| 8,445,786 B2* | 5/2013 | Cree et al. | ................. | 174/110 R |
| 2004/0079547 A1 | 4/2004 | Rodway et al. | | |
| 2004/0097619 A1 | 5/2004 | Troutman et al. | | |
| 2006/0084731 A1 | 4/2006 | Troutman et al. | | |
| 2006/0194909 A1 | 8/2006 | Inoue et al. | | |
| 2007/0048524 A1* | 3/2007 | Hase | ............................ | 428/375 |
| 2008/0234419 A1 | 9/2008 | Kambe | | |

(Continued)

FOREIGN PATENT DOCUMENTS

| CN | 1496570 A | 5/2004 |
|---|---|---|
| CN | 1498244 A | 5/2004 |
| CN | 1802410 A | 7/2006 |

(Continued)

OTHER PUBLICATIONS

Jul. 12, 2011 International Search Report issued in International Patent Application No. PCT/JP2011/058394 (with translation).

(Continued)

Primary Examiner — Liam J Heincer
(74) Attorney, Agent, or Firm — Oliff PLC (57) ABSTRACT

To provide a composition for a wire coating member containing a non-crosslinked material at a low cost, which has superior flame retardancy, and is excellent in heat resistance, wear resistance and flexibility, and to provide an insulated wire and a wiring harness containing the composition. The composition contains (A) polypropylene, (B) a polyolefin elastomer, (C) a bromine flame retardant, (D) an antimony trioxide, (E) magnesium hydroxide, either one of (F) (F1) a zinc sulfide and (F2) a zinc oxide and (F3) mercaptobenzimidazole, and (G) a hindered phenolic antioxidant. The insulated wire includes a conductor and an insulation coat made from the composition, wherein the insulation coat has a thickness of 0.5 mm or less, and the insulated wire has an external diameter of 4 mm or less. The wiring harness includes the insulated wire.

17 Claims, 1 Drawing Sheet (56) References Cited

U.S. PATENT DOCUMENTS

2009/0238957 A1* 9/2009 Clancy .................. 427/117
2011/0056728 A1* 3/2011 Shiraki et al. .......... 174/110 SR

FOREIGN PATENT DOCUMENTS

| DE | 10 2008 011 146 A1 | | 9/2008 |
|----|----|----|----|
| JP | A-07-056063 | | 3/1995 |
| JP | A-2006-131720 | | 5/2006 |
| JP | A-2008-117691 | | 5/2008 |
| JP | A-2008-231317 | | 10/2008 |
| JP | A-2009-051918 | | 3/2009 |
| JP | A-2010-138375 | | 6/2010 |
| WO | WO2009/002845 | * | 12/2008 |
| WO | WO 2010/024602 A2 | | 3/2010 |
| WO | WO2010/087254 | * | 8/2010 |

OTHER PUBLICATIONS

Jan. 21, 2014 Chinese Office Action issued in Chinese Patent Application No. 201180018045.6 (with English-language Translation).
May 26, 2014 German Office Action issued in Application No. 112011101191.1 (with English Translation).
Jun. 18, 2014 Chinese Office Action issued in Application No. 201180018045.6 (with English Translation).

* cited by examiner

COMPOSITION FOR WIRE COATING MEMBER, INSULATED WIRE, AND WIRING HARNESS

TECHNICAL FIELD

The present invention relates to a composition for a wire coating member, an insulated wire, and a wiring harness, and more specifically relates to a composition for a wire coating member that has flame retardancy favorable for a wire coating member used for an automotive electric wire of which high heat resistance is required, an insulated wire containing the composition, and a wiring harness containing the composition.

BACKGROUND ART

Conventionally, a crosslinked polyvinyl chloride resin wire and a crosslinked polyolefin wire are used as electric wires for use in a high-temperature location such as wiring harnesses for automobile. These crosslinked wires are generally electron irradiation crosslinked, or crosslinked under water vapor atmosphere while using a silane functional group in a coating material.

For example, PTL 1 discloses, as a composition for a wire coating member, a resin composition for use by mixing with silane-crosslinkable polyolefin, the resin composition containing 100 parts by mass of polymer that is selected from a group consisting of a thermoplastic resin, rubber and a thermoplastic elastomer, 0.01 to 0.6 parts by mass of organic peroxide, 0.05 to 0.5 parts by mass of silanol condensation catalyst, and 100 to 300 parts by mass of magnesium hydroxide.

CITATION LIST

Patent Literature

PTL 1: Patent JP 2006-131720

SUMMARY OF INVENTION

Technical Problem

However, there arises a problem that when using the insulated wire in which the conventional crosslinkable resin composition is used, facilities for crosslinking the resin are required. In the case of the electron irradiation crosslinking, large-scale facilities are required. In addition, there arises a problem that when using the silane functional group in the coating material, the kind of the coating material is limited to cause an increase in cost. Further, because the insulated wire in which the crosslinkable resin is used requires facilities for crosslinking, the wire products are prevented from being supplied on a global basis.

Meanwhile, inorganic hydroxide such as magnesium hydroxide that defines a flame retardant is added to the resin in order to provide flame retardancy to the insulated wire as cited in PTL 1. In the case of an electric wire for automobile, a great amount of the flame retardant needs to be added to the resin in order to satisfy flame retardancy required of the wire. However, the addition of the great amount of flame retardant such as inorganic hydroxide causes a problem of decreasing mechanical strength of the resin coat.

An insulated wire of which an insulation coat is made from a composition containing a non-crosslinked resin instead of a crosslinked resin is superior in flexibility to an electric wire in which a crosslinked resin is used, and can be provided at a low cost. However, the insulated wire of which the insulation coat is made from the flame retardant resin composition containing the non-crosslinked material has a problem of being insufficient in properties such as heat resistance and wear resistance.

The present invention is made in view of the problems described above, and an object of the present invention is to provide a composition for a wire coating member containing a non-crosslinked material at a low cost, which has superior flame retardancy, and is excellent in flexibility, heat resistance and wear resistance. In addition, other objects of the present invention are to provide an insulated wire containing the composition, and a wiring harness containing the composition at a low cost.

Solution to Problem

To achieve the objects and in accordance with the purpose of the present invention, a composition for a wire coating member of the present invention contains (A) polypropylene,
(B) a polyolefin elastomer,
(C) a bromine flame retardant,
(D) an antimony trioxide,
(E) magnesium hydroxide,
either one of (F) (F1) a zinc sulfide, and (F2) a zinc oxide and (F3) mercaptobenzimidazole, and
(G) a hindered phenolic antioxidant.

In another aspect of the present invention, an insulated wire of the present invention includes an insulation coat made from the composition for the wire coating member described above, wherein the insulation coat has a thickness of 0.5 mm or less, and the insulated wire has an external diameter of 4 mm or less.

Yet, in another aspect of the present invention, a wiring harness of the present invention includes the insulated wire described above.

Advantageous Effects of Invention

The composition for the wire coating member of the present invention contains (A) the polypropylene,
(B) the polyolefin elastomer,
(C) the bromine flame retardant,
(D) the antimony trioxide,
(E) the magnesium hydroxide, the either one of (F) (F1) the zinc sulfide, and (F2) the zinc oxide and (F3) the mercaptobenzimidazole, and
(G) the hindered phenolic antioxidant. Thus, the composition for the wire coating member of the present invention is capable of forming a resin coat that is excellent in flame retardancy, heat resistance, wear resistance, and flexibility even if the resin coat is a non-crosslinked resin coat.

Further, it is not necessary to add a great amount of filler such as magnesium hydroxide that defines a flame retardant to the resin, so that there is no possibility of decreasing heat resistance the resin inherently has, which is caused by adding a great amount of filler to the resin.

Containing the composition for the wire coating member described above, and including the insulation coat having the thickness of 0.5 mm or less, and having the external diameter of 4 mm or less, the insulated wire of the present invention is excellent in flame retardancy, heat resistance, wear resistance, and flexibility, and can be provided at a low cost.

Including the insulated wire described above, the wiring harness of the present invention is excellent in flame retardancy, heat resistance, wear resistance, and flexibility, and can be provided at a low cost.

DESCRIPTION OF EMBODIMENTS

A detailed description of preferred embodiments of the present invention will now be provided. A composition for a wire coating member of the present invention preferably contains (A) polypropylene,
(B) a polyolefin elastomer,
(C) a bromine flame retardant,
(D) an antimony trioxide,
(E) magnesium hydroxide,
either one of (F) (F1) a zinc sulfide, and (F2) a zinc oxide and (F3) mercaptobenzimidazole,
(G) a hindered phenolic antioxidant,
(H) (H1) a functional-group modified styrene elastomer that is modified by a compound including a functional group, or (H2) a functional-group modified polyolefin that is modified by a compound including a functional group,
(I) an unmodified styrene elastomer, and
(J) a copper inhibitor.

Descriptions of the components will be provided below.

(A) The polypropylene is used as a base resin material. The polypropylene contained in a coat of an electric wire improves heat resistance of the coat while decreasing flexibility of the coat compared with polyethylene. However, the decreased flexibility due to the use of polypropylene does not matter if the electric wire has a small diameter. Thus, the flame-retardant resin coat can be obtained, which is excellent in heat resistance even if the resin is a non-crosslinked resin. It is preferable that (A) the polypropylene is not modified by a functional group or a silane coupling agent.

Examples of (A) the polypropylene include a polypropylene homopolymer, block polypropylene that defines a copolymer of ethylene and butylene, and random polypropylene. It is preferable that the polypropylene contains 50% by mass or more of a propylene component. The molecular structure of the polypropylene is not limited specifically, and syndiotactic polypropylene, isotactic polypropylene or atactic polypropylene is preferably used.

(A) The polypropylene preferably has a flexural modulus within the range of 800 to 2000 MPa, and more preferably within the range of 1000 to 1500 MPa. When the flexural modulus of the polypropylene is larger, the polypropylene is capable of providing wear resistance to the electric wire while the flexibility of the electric wire is reduced. When the polypropylene has the flexural modulus within the ranges described above, a harmonious balance can be maintained among wear resistance and flexibility.

(A) The polypropylene preferably has an MFR (melt flow rate) at 230 degrees C. within the range of 0.5 to 5 g/10 min, and more preferably within the range of 0.5 to 3 g/10 min. When the MFR of the polypropylene is smaller, the dispersibility of a filler such as a flame retardant is reduced to cause generation of an aggregated unintended substance. When the MFR of the polypropylene is too large, mechanical properties such as wear resistance are reduced. When the polypropylene has the MFR within the ranges described above, the polypropylene has a sufficient fluidity when the material are mixed without loss of productivity, whereby the electric wire that has favorable mechanical properties can be obtained. It is to be noted that all the MFRs define values that are measured at 230 degrees C. in the present invention.

(B) The polyolefin elastomer is used to provide flexibility to the coat. Examples of (B) the polyolefin elastomer include an olefinic thermoplastic elastomer (TPO), an ethylene-propylene copolymer (EPM, EPR), an ethylene propylene-diene copolymer (EPDM, EPT), butadiene rubber (BR), and hydrogenated butadiene rubber (EBR). It is preferable that (B) the polyolefin elastomer is not modified by a functional group or a silane coupling agent.

(B) The polyolefin elastomer preferably has a flexural modulus less than 300 MPa, and more preferably less than 250 MPa. When the flexural modulus of the polypropylene is smaller, the flexibility of the electric wire is improved.

(B) The polyolefin elastomer preferably has an MFR (melt flow rate) of 1 g/10 min or more. The upper limit of the MFR of polyolefin elastomer is 10 g/10 min. When the MFR of the polyolefin elastomer is smaller, the dispersibility of the filler such as the flame retardant reduced to cause generation of an aggregated unintended substance. When the MFR of the polyolefin elastomer is larger, the melting property of the polyolefin elastomer with the polypropylene that defines the base material is reduced, resulting in reduction in wire properties such as tensile elongation and wear resistance. When the polyolefin elastomer has the flexural modulus within the range described above, such reduction can be decreased.

It is preferable that the composition for the wire coating member of the present invention further contains resins such as (H) the functional-group modified resin and (I) the unmodified styrene elastomer in addition to the (A) and (B) components. (H1) The functional-group modified styrene elastomer, (H2) the functional-group modified polyolefin, or (H1) the functional-group modified styrene elastomer and (H2) the functional-group modified polyolefin are used as (H) the functional-group modified resin. (H1) The functional-group modified styrene elastomer and (H2) the functional-group modified polyolefin define resins into which functional groups are introduced, the resins being prepared by introducing compounds containing the functional groups to a styrene elastomer (also referred to as a styrene thermoplastic elastomer or a styrene block copolymer) and polyolefin. The addition of (H) the functional-group modified resin in the resin composition improves the dispersibility of the filler such as the flame retardant, which improves the physical properties of the coat. In addition, the addition of (H) the functional-group modified resin improves the mixing property of the coating material, which prevents the electric wire from having surface asperities, and accordingly the electric wire has favorable surface appearance. Thus, favorable wire extrusion may be performed.

Examples of the functional group of (H) the functional-group modified resin include a carboxylic acid group, an acid anhydrous group, an amino group, an epoxy group, a silane group, and a hydroxyl group. Among them, the carboxylic acid group, the acid anhydrous group, the amino group, and the epoxy group are preferably used because the composition can obtain a favorable adhesion property mainly with an inorganic filler.

The styrene elastomer used for (H1) the functional-group modified styrene elastomer defines a block copolymer of polystyrene (PS), which defines a hard segment, and polybutadiene (BR), polyisoprene (IR), hydrogenated (or partially-hydrogenated) BR (EB), or hydrogenated (or partially-hydrogenated) IR (EP), which defines a soft segment. Examples of the styrene elastomer include a styrene-butadiene block copolymer, a styrene-ethylene-butadiene-styrene copolymer that is a hydrogenated or partially-hydrogenated derivative of the styrene-butadiene block copolymer, 1,2-polybutadiene, a maleic-anhydride modified styrene-ethylene-butadiene-styrene copolymer, a modified butadiene rubber with a core-shell structure, a styrene-isoprene block copolymer, a styrene-ethylene-isoprene-styrene copolymer that is a hydrogenated or partially hydrogenated derivative of the styrene-isoprene block copolymer, a maleic-anhydride modified styrene-ethylene-isoprene-styrene copolymer, and a modified isoprene rubber with a core-shell structure.

A plurality of combined butadiene and isoprene, or hydrogenated or partially-hydrogenated derivatives of the butadiene and isoprene are preferably used as the polymer that is copolymerized with the styrene in the styrene elastomer. The styrene elastomer may be used singly or in combination. The ratio (mass ratio) of the hard segment to the soft segment is preferably within the range of 10:90 to 40:60.

Examples of the polyolefin used for (H2) the functional-group modified polyolefin include polyethylene such as high density polyethylene (HDPE), middle density polyethylene (MDPE), low density polyethylene (LDPE), linear low density polyethylene (LLDPE) and very density polyethylene (VLDPE), polypropylene, homopolymers of the other olefins, an ethylene copolymer such as an ethylene-alpha-olefin copolymer, an ethylene-vinyl acetate copolymer, an ethylene-acrylic ester copolymer and an ethylene-methacrylic ester copolymer, a propylene copolymer such as a propylene-alpha-olefin copolymer, a propylene-vinyl acetate copolymer, a propylene-acrylic ester copolymer and a propylene-methacrylic ester copolymer, and an olefin-based elastomer such as an ethylene elastomer (PE elastomer) and a propylene elastomer (PP elastomer). They may be used singly or in combination.

Among them, the polyethylene, the polypropylene, the ethylene-vinyl acetate copolymer, the ethylene-acrylic ester copolymer and the ethylene-methacrylic ester copolymer are preferably used as the polyolefin.

(H1) The functional-group modified styrene elastomer and (H2) the functional-group modified polyolefin may contain one or a plurality of functional groups. In addition, one or a plurality of modified resins may be used, which are selected from modified resins of a same kind or different kinds that are modified by different functional groups, and modified resins of different kinds that are modified by functional groups of a same kind.

The content of the functional group of (H) the functional-group modified resin is preferably 0.5 to 10 parts by mass with respect to 100 parts by mass of the unmodifed resin. If the content is more than 10 parts by mass, decortication ability of the coat at the time of processing end portions of the electric wire is reduced. On the other hand, if the content is less than 0.5 parts by mass, the modifying effect by the functional group could be insufficient.

The polyolefin is modified by the functional group in a method of graft-polymerizing the compound containing the functional group onto the polyolefin, or in a method of copolymerizing the compound containing the functional group and an olefin monomer to obtain an olefin copolymer.

Examples of the compound for introducing the carboxylic acid group and/or the acid anhydrous group that defines the functional group include an alpha, beta-unsaturated dicarboxylic acid such as a maleic acid, a fumaric acid, a citraconic acid and an itaconic acid, anhydrides thereof, and an unsaturated monocarboxylic acid such as an acrylic acid, a methacrylic acid, a fran acid, a crotonic acid, a vinylacetic acid and a pentane acid.

Examples of the compound for introducing the amino group that defines the functional group include aminoethyl (meth)acrylate propylaminoethyl(meth)acrylate, dimethyl aminoethyl(meth)acrylate, diethyl aminoethyl(meth)acrylate, dibutyl aminoethyl(meth)acrylate aminopropyl(meth) acrylate phenylaminoethyl(meth)acrylate, and cyclohexylaminoethyl(meth)acrylate.

Examples of the compound for introducing the epoxy group that defines the functional group include glycidyl acrylate, glycidyl methacrylate, an itaconic monoglycidyl ester, a butene tricarboxylic acid monoglycidyl ester, a butene tricarboxylic acid diglycidyl ester, a butene tricarboxylic acid triglycidyl ester, glycidyl esters such as an alpha-chloroacrylic acid, a maleic acid, a crotonic acid and a fumaric acid, glycidyl ethers such as a vinyl glycidyl ether, an allyl glycidyl ether, a glycidyl oxyethyl vinyl ether and a styrene-p-glycidyl ether, and p-glycidyl styrene.

It is preferable that the composition for the wire coating member of the present invention further contains (I) the unmodified styrene elastomer in addition to the above described resins. The styrene elastomer that is yet to be modified, which is described above as the styrene elastomer used for the functional-group modified styrene elastomer, can be used as the unmodified styrene elastomer.

In the composition for the wire coating member of the present invention, the resin component consisting of (A) the polypropylene and (B) the polyolefin elastomer makes up normally 35% by mass or more, preferably 40% by mass or more, and more preferably 45% by mass or more of the whole composition. If the composition for the wire coating member of the present invention further contains the resins in addition to (A) the polypropylene and (B) the polyolefin elastomer, (A) the polypropylene and (B) the polyolefin elastomer make up preferably a total of 70% by mass or more, and more preferably a total of 80% by mass or more of the resin component.

The mixing ratio (mass ratio) of (A) the polypropylene to (B) the polyolefin elastomer is preferably within the range of 50:50 to 90:10. When the mixing ratio (mass ratio) of (A) the polypropylene to (B) the polyolefin elastomer is within the range described above, there is an advantage that favorable mechanical properties such as wear resistance can be obtained.

The content of the resin component consisting of (H) the functional-group modified resin and (I) the unmodified styrene elastomer other than the (A) and (B) components is preferably within the range of 5 to 40 parts by mass, and more preferably within the range of 5 to 20 parts by mass with respect to 100 parts by mass of the total content of the (A) and (B) components. When the content of the other resin component is within the range described above, the composition obtains favorable wire properties such as tensile elongation, which allows the coating material to be mixed favorably without reducing its melting property with the base material.

The composition for the wire coating member of the present invention contains (C) the bromine flame retardant, (D) the antimony trioxide, and (E) the magnesium hydroxide that define flame retardants. Using (D) the antimony trioxide in combination with (C) the bromine flame retardant produces a synergistic effect in flame retardancy. The addition of (E) the magnesium hydroxide can produce a flame retardant effect and adjust the hardness of the coat. In the present invention, the magnesium hydroxide is not used alone as the flame retardant, so that the content of the magnesium hydroxide can be reduced compared with the case where the magnesium hydroxide is used alone. For this reason, there is no possibility of reduction in mechanical strength of the coat caused by adding a great amount of magnesium hydroxide. In addition, because the addition of magnesium hydroxide can reduce the content of the bromine flame retardant, the content of an organohalogen compound in the composition can be reduced, which can contribute to halogen reduction.

Examples of (C) the bromine flame retardant include ethylenebis (pentabromobenzene) [also known as bis(pentabromophenyl)ethane], tetrabromobisphenolA (TBBA), hexabromocyclododecane (HBCD), bis (tetrabromophthalimide) ethane, TBBA-carbonate oligomer, TBBA-epoxyoligomer, brominated polystyrene, TBBA-bis (dibromopropylether), poly (dibromopropylether), and hexabromobenzene (HBB). Having favorable flame retardancy, the bromine flame retardant that has a relatively high melting point is preferably used. To be specific, the bromine flame retardant that has a melting point of 200 degrees C. or more is preferably used. Among them, the ethylenebis (pentabromobenzene), the bis (tetrabromophthalimide) ethane, and the TBBA-bis (dibromopropylether) are preferably used. These bromine flame retardants are compatible with a flame retardant system of the resin of the base material, and can produce a favorable flame-retardant effect.

It is to be noted that a flame retardant containing a decabromo compound such as decabromo diphenyl ether (DecaBDE) has a profound flame-retardant effect; however, corresponding to Class I Designated Chemical Substances set forth in Article 4 of the Act on Confirmation, etc. of Release Amounts of Specific Chemical Substances in the Environment and Promotion of Improvements to the Management Thereof, the flame retardant has a disadvantage against other bromine flame retardants from the viewpoint of the environment, and thus cannot be used in the present invention.

It is preferable to use (D) the antimony trioxide that has a purity of 99% or more. (D) The antimony trioxide that is prepared by pulverizing and microparticulating antimony trioxide that is produced as a mineral is preferable because it is low in cost and high in purity. (D) The antimony trioxide has an average particle size of preferably 3 μm or less, and more preferably 1 μm or less. If the average particle size of the antimony trioxide is larger, the interface strength between the antimony trioxide and the resin could be decreased. In addition, the antimony trioxide may be subjected to a surface treatment in order to adjust the particle size or improve the interface strength between the antimony trioxide and the resin. Examples of the surface treatment agent include a silane coupling agent, a higher fatty acid and a polyolefin wax.

Natural magnesium hydroxide of natural mineral origin that is prepared by pulverizing a mineral predominantly composed of magnesium hydroxide, or synthesized magnesium hydroxide that is synthesized from an Mg source contained in seawater is used as (E) the magnesium hydroxide. The magnesium hydroxide has a particle size of normally about 0.5 to 20 μm, preferably 0.5 to 10 μm, and more preferably 0.5 to 5 μm. If the particle size of the magnesium hydroxide is more than 20 μm, the wire is liable to have marred surface appearance. If the particle size of the magnesium hydroxide is less than 0.5 μm, secondary cohesion is brought about, resulting in reduction in wire properties.

In addition, the magnesium hydroxide could have a reduced adhesion property with the resins, which is reduced due to asperities on particle surfaces of the magnesium hydroxide, so that the magnesium hydroxide may be subjected to a surface treatment using one or more than one kind of surface treatment agent. Examples of the surface treatment agent include a silane coupling agent, a titanate coupling agent, a fatty acid compound, a fatty acid salt compound, a fatty acid ester compound, and an olefin wax. The content of the surface treatment agent is preferably 0.3 to 5% by mass with respect to the total content of the magnesium hydroxide and the surface treatment agent. A method of the surface treatment is not limited specifically, and a variety of known methods can be used. If the content of the surface treatment agent is less than 0.5% by mass, the effect of improving the wire properties is not produced. If the content of the surface treatment agent is more than 5% by mass, the content goes beyond the amount necessary for the surface treatment, resulting in reduction in wire properties.

The contents of the flame retardants are described below. The content of (C) the bromine flame retardant is preferably in the range of 10 to 30 parts by mass, and more preferably in the range of 10 to 25 parts by mass with respect to 100 parts by mass of the total content of (A) the polypropylene and (B) the polyolefin elastomer.

The content of (D) the antimony trioxide is preferably in the range of 1 to 20 parts by mass, and more preferably in the range of 3 to 10 parts by mass with respect to 100 parts by mass of the total content of (A) the polypropylene and (B) the polyolefin elastomer.

The content of (E) the magnesium hydroxide is preferably in the range of 10 to 90 parts by mass, and more preferably in the range of 20 to 70 parts by mass with respect to 100 parts by mass of the total content of (A) the polypropylene and (B) the polyolefin elastomer.

When the contents of the flame retardants are within the ranges described above, a sufficient flame-retardant effect is produced while the cost can be prevented from increasing more than necessary. Thus, a harmonious balance can be maintained among the flame retardancy and the cost.

(F) (F1) The zinc sulfide, or (F2) the zinc oxide and (F3) mercaptobenzimidazole, are contained in the composition as an additive to improve heat resistance. Even when (F1) the zinc sulfide is contained alone, or (F2) the zinc oxide and (F3) the mercaptobenzimidazole are contained in combination, an effect of heat resistance can be produced in both of the cases.

(F2) The zinc oxide is produced in a method of oxidizing zinc vapors, which exude from a zinc mineral by adding a reducing agent such as coke thereto and firing the zinc mineral, by air, or in a method of producing from a zinc sulfide or a zinc chloride. The production method of (F2) the zinc oxide is not limited specifically. The zinc oxide may be produced in either method. (F1) The zinc sulfide may be produced in a known production method. The zinc oxide or the zinc sulfide has an average particle size of preferably 3 μm or less, and more preferably 1 μm or less. If the average particle size of the zinc oxide or the zinc sulfide is smaller, the interface strength between the zinc oxide or the zinc sulfide and the resin is improved, which improves dispersibility.

Examples of (F3) the mercaptobenzimidazole include 2-mercaptobenzimidazole, 2-mercaptomethylbenzimidazole, 4-mercaptomethylbenzimidazole, 5-mercaptomethylbenzimidazole, and zinc salt thereof. Among them, the 2-mercaptobenzimidazole and the zinc salt thereof are preferably used because they have high melting points, and are stable at high temperatures because only a small amount of the 2-mercaptobenzimidazole or the zinc salt thereof sublime during the mixing.

If the content of (F1) the zinc sulfide, or the content of (F2) the zinc oxide and (F3) the mercaptobenzimidazole is too small, an effect of improving heat resistance cannot be obtained sufficiently. If the content of (F1) the zinc sulfide, or the content of (F2) the zinc oxide and (F3) the mercaptobenzimidazole is too large, the particles are liable to coagulate, and the wire is liable to have marred surface appearance, and mechanical properties such as wear resistance could be reduced. Thus, the contents are preferably within the ranges described below.

The content of (F1) the zinc sulfide: 3 to 15 parts by mass
The content of (F2) the zinc oxide: 1 to 15 parts by mass
The content of (F3) the mercaptobenzimidazole: 2 to 15 parts by mass
The total content of (F2) the zinc oxide and (F3) the mercaptobenzimidazole: 2 to 30 parts by mass
The contents are presented with respect to 100 parts by mass of the total content of (A) the polypropylene and (B) the polyolefin elastomer.

The effect of the mercaptobenzimidazole is not lessened even if the mercaptobenzimidazole is used in combination with other additives. Examples of the additives include a thiazole compound, a sulfenamide compound, a thiuram compound, a dithiocarbamate compound, and a xanthate compound. One or more than one kind of the additive may be used.

Examples of the sulfenamide compound include N-cyclohexyl-2-benzothiazole sulfenamide, N-tert-butyl-2-benzothiazole sulfenamide, N-oxydiethylene-2-benzothiazole sulfenamide, N,N-diisopropyl-2-benzothiazole sulfenamide, and N,N'-dicyclohexyl-2-benzothiazole sulfenamide.

Examples of the thiuram compound include tetramethylthiuram monosulfide, tetramethylthiuram disulfide, tetraethylthiuram disulfide, tetrabutylthiuram disulfide, dipentamethylenethiuram tetrasulfide, and tetrakis(2-ethylhexyl) thiuramdisulfide.

Examples of the dithiocarbamate compound include zinc dimethylthiocarbamate, zinc diethyldithiocarbamate, zinc di-n-butyl dithiocarbamate, zinc N-ethyl-N-phenyldithiocarbamate, zinc N-pentamethylene dithiocarbamate, and zinc dibenzyl dithiocarbamate.

Examples of the xanthate compound include isopropyl sodium xanthate, zinc isopropyl xanthate, and zinc butyl xanthate.

Examples of (G) the hindered phenolic antioxidant include pentaerythritol tetrakis [3-(3,5-di-tert-butyl-4-hydroxyphenyl)propionate, thiodiethylenebis
[3-(3,5-di-tert-butyl-4-hydroxyphenyl)propionate], octadecyl-3-(3,5-di-tert-butyl-4-hydroxyphenyl) propionate, N,N'-hexane-1,6-diylbis
[3-(3,5-di-tert-butyl-4-hydroxyphenyl propione amide)], benzene propanoic acid,
3,5-bis(1,1-dimethylethyl)-4-hydroxy, C7-C9 side-chain alkyl ester, 2,4-dimethyl-6-(1-methyl pentadecyl) phenol, diethyl
[[3,5-bis(1,1-dimethylethyl)-4-hydroxyphenyl]methyl] phosphonate,
3,3',3",5,5',5"-hexa-tert-butyl-a,a',a"-(mesitylene-2,4,6-triyl)tri-p-cresol, calcium diethylbis[[[3,5-bis (1,1-dimethylethyl)-4-hydroxyphenyl]methyl]phosphonate], 4,6-bis(octylthiomethyl)-o-cresol, ethylenebis (oxyethylene) bis
[3-(5-tert-butyl-4-hydroxy-m-tolyl)propionate], hexamethylenebis
[3-(3,5-di-tert-butyl-4-hydroxyphenyl)propionate, 1,3,5-tris (3,5-di-tert-butyl-4-hydroxybenzyl)-1,3,5-triazine-2,4,6 (1H,3H,5H)-trione, 1,3,5-tris
[(4-tert-butyl-3-hydroxy-2,6-xylyl) methyl]-1,3,5-triazine-2, 4,6(1H,3H,5H)-trione,
2,6-tert-butyl-4-(4,6-bis (octylthio)-1,3,5-triazine-2-ylamino)phenol,
2,6-di-tert-butyl-4-methylphenol, 2,2'-methylenebis (4-methyl-6-tert-butylphenol), 4,4'-butylidenebis (3-methyl-6-tert-butylphenol), 4,4'-thiobis (3-methyl-6-tert-butylphenol), and 3,9-bis[2-(3-(3-tert-butyl-4-hydroxy-5-methylphenyl)-propionyloxy)-1,1-dimethylethyl]-2,4,8, 10-tetraoxaspiro (5,5) undecane. One or more than one kind of the hindered phenolic antioxidant may be used. Among them, the pentaerythritol tetrakis [3'-(3,5-di-tert-butyl-4-hydroxyphenyl)propionate, and the thiodiethylenebis [3-(3,5-di-tert-butyl-4-hydroxyphenyl]propionate] are preferably used. The use of the antioxidants) prevents hydrogen abstraction of tertiary carbon atoms of the polypropylene, which makes the molecules so as not to easily collapse.

The content of (G) the hindered phenolic antioxidant is preferably in the range of 1 to 10 parts by mass, and more preferably in the range of 1 to 5 parts by mass with respect to 100 parts by mass of the total content of (A) the polypropylene and (B) the polyolefin elastomer. When the content of (G) the hindered phenolic antioxidant is within the ranges described above, the composition is excellent in aging property, and generation of blooms, which is caused when a great amount of hindered phenolic antioxidant is added, can be prevented.

An amine copper inhibitor such as 3-[N-salicyloyl]amino-1,2,4-triazole is used as (J) the copper inhibitor. The addition of (J) the copper inhibitor further improves heat resistance. The content of (J) the copper inhibitor is preferably in the range of 0.1 to 3 parts by mass with respect to 100 parts by mass of the total content of (A) the polypropylene and (B) the polyolefin elastomer.

It is preferable that the composition for the wire coating member of the present invention further contains an additive, which is used for a general wire coating member, within a range of not impairing the properties of the electric wire.

Next, a description of an insulated wire of the present invention will be provided. The insulated wire includes a conductor and a wire coating member (referred to also as an insulation coat) with which the conductor is covered, the member being made from the composition for the wire coating member described above. The conductor is generally made from copper; however, a metal such as aluminum or magnesium can be used. It is also preferable that the copper contains another metal. Examples of the another metal include iron, nickel, magnesium and silicon. A metal, which is generally used for the conductor, may be added to the copper, or may be used alone. A single wire or a stranded wire of single wires may be used for the conductor. The stranded wire is preferable because it can be compressed so as to have a small diameter.

The insulated wire defines a small-diameter wire having an external diameter of 4 mm or less. The insulation coat of the insulated wire has a thickness of 0.5 mm or less. The insulation coat may be a single coat, or multi coat.

A description of a method for producing the insulated wire from the composition for the wire coating member will be provided. It is essential only that the composition for the wire coating member that contains the components described above should be heat-kneaded, and the conductor should be extrusion-coated with the heat-kneaded mixture to form the insulation coat around the conductor. The insulated wire of the present invention is used while the resin of the coat is non-crosslinked. The insulation coat, which is made from the non-crosslinked resin, has the following advantage. While a crosslinked wire, which has its resin cured, lacks flexibility, the non-crosslinked resin can obtain flexibility. When the electric wire is recycled, the non-crosslinked resin can be easily recycled while the crosslinked resin cannot be easily recycled. In order to crosslink the resin, a facility such as an electron irradiation device and a steam-heating device is required, and a process of crosslinking treatment is required. In contrast, the non-crosslinked wire does not require this kind of facility nor the crosslinking process. For this reason, the non-crosslinked wire can be provided at a low cost compared with the crosslinked wire, and has improved productivity.

The heat-kneading of the components described above can be performed with the use of a generally used kneader such as a Banbury mixer, a pressure kneader, a kneading extruder, a twin-screw extruder and a roll.

Next, a description of a wiring harness of the present invention will be provided. The wiring harness includes the insulated wires described above. The wiring harness has a configuration such that a single wire bundle composed of the insulated wires described above only, or a mixed wire bundle composed of the insulated wires described above and other insulated wires is covered with a wiring harness protection member.

The number of the wires included in the single wire bundle or the mixed wire bundle is not limited specifically, and may be arbitrarily determined.

When using the mixed wire bundle, the structure of the other insulated wires is not limited specifically. The insulated coating member may have a single-layered structure, or may have a multi-layered structure. In addition, the kind of the wire coating member is not limited specifically.

In addition, the wiring harness protection member is arranged to cover the outer surface of the wire bundle to protect the wire bundle inside. Examples of the wiring harness protection member include a wiring harness protection member including a tape-shaped base member on at least one side of which an adhesive is applied, a wiring harness protection member including a tube-shaped base member, and a wiring harness protection member including a sheet-shaped base member. The wiring harness protection member is preferably chosen depending on the intended use.

Specific examples of a base material for the wiring harness protection member include non-halogenous flame-retardant resin compositions of various types, vinyl chloride resin compositions of various types, and halogenous resin compositions of various types other than the vinyl chloride resin compositions.

EXAMPLE

Hereinafter, Examples of the present invention, and Comparative Examples are presented. However, the present invention is not limited to the Examples.

(Material Used, Manufacturer, and Other Information)

Materials used in the Examples and Comparative Examples are provided below along with their manufacturers and trade names. Flexural moduli and MFRs of polypropylene and polyolefin elastomers are presented.

(A: Polypropylene)

[1] PP1: manuf.: JAPAN POLYPROPYLENE CORPORATION, trade name: "NOVATEC FY6C", Flexural modulus: 2100 0 MPa, MFR: 2.4 g/10 min

[2] PP2: manuf.: JAPAN POLYPROPYLENE CORPORATION, trade name: "NOVATEC EC9", Flexural modulus: 1200 MPa, MFR: 0.5 g/10 min

[3] PP3: manuf.: SUMITOMO CHEMICAL CO., LTD., trade name: "WP712", Flexural modulus: 750 MPa, MFR: 15 g/10 min

[4] PP4: manuf.: LYONDELLBASELL, trade name: "EP-310D", Flexural modulus: 1200 MPa, MFR: 0.5 g/10 min (B: Polyolefin elastomer)

[5] Olefin elastomer 1: manuf.: LYONDELLBASELL, trade name: "Adflex Q100F", Flexural modulus: 80 MPa, MFR: 0.6 g/10 min

[6] Olefin elastomer 2: manuf.: LYONDELLBASELL, trade name: "Adflex Q300F", Flexural modulus: 330 MPa, MFR: 0.8 g/10 min

[7] Olefin elastomer 3: manuf.: SUMITOMO CHEMICAL CO., LTD., trade name: "ESPOLEX 821", Flexural modulus: 62 MPa, MFR: 1.2 g/10 min

[8] Olefin elastomer 4: manuf.: SUMITOMO CHEMICAL CO., LTD., trade name: "ESPOLEX 817", Flexural modulus: 360 MPa, MFR: 1.1 g/10 min (I: Unmodified styrene elastomer)

[9] Styrene elastomer 1: manuf.: ASAHI KASEI CHEMICALS CORPORATION, trade name: "Tuftec H1041"

[10] Styrene elastomer 2: manuf. KURARAY CO LTD., trade name: "SEPTON 2002"

(H: Functional-group modified resin)

[11] Maleic-acid modified styrene elastomer: manuf.: ASAHI KASEI CHEMICALS CORPORATION, trade name: "Tuftec M1913"

[12] Amino-acid modified styrene elastomer: manuf.: ASAHI KASEI CHEMICALS CORPORATION, trade name: "Tuftec MP10"

[13] Maleic-acid modified polyolefin: manuf.: MITSUBISHI CHEMICAL CORPORATION, trade name: "ADMER QE800"

(C: Bromine flame retardant)

[14] Bromine flame retardant 1: Ethylenebis (pentabromobenzene): manuf.: ALBEMARLE JAPAN CORPORATION, trade name: "SAYTEX8010"

[15] Bromine flame retardant 2: TBBA-bis (dibromopropylether): manuf.: SUZUHIRO CHEMICAL CO., LTD., trade name: "FCP-680"

[16] Bromine flame retardant 3: tetrabromobisphenolA: manuf.: ALBEMARLE JAPAN CORPORATION, trade name: "SAYTEXCP2000"

(D: Antimony trioxide)

[17] Antimony trioxide: manuf.: YAMANAKA & CO., LTD., trade name: "Antimony trioxide MSW grade"

(E: Magnesium hydroxide)

[18] Magnesium hydroxide: manuf.: KYOWA CHEMICAL INDUSTRY CO., LTD., trade name: "KISUMA 5"

(G: Hindered phenolic antioxidant

[19] Hindered phenolic antioxidant 1: manuf.: CIBA SPECIALTY CHEMICALS INC., trade name: "IRGANOX 1010"

[20] Hindered phenolic antioxidant 2: manuf.: CIBA SPECIALTY CHEMICALS INC., trade name: "IRGANOX 1330"

(J)

[21] Copper inhibitor [Manuf.: ADEKA CORPORATION, trade name: CDA-1]

(F)

[22] Zinc oxide [Manuf.: HAKUSUITECH CO., LTD., trade name: "ZINC OXIDE JIS"]

[23] Zinc sulfide [Manuf. SACHTLEBEN CHEMIE GMBH, trade name: "SACHTOLITH HD-S"]

[24] Mercaptobenzimidazole 1: Manuf.: KAWAGUCHI CHEMICAL INDUSTRY CO., LTD., trade name: "ANTAGE MB"]

[25] Mercaptobenzimidazole 2: Manuf.: OUCHI SHINKO CHEMICAL INDUSTRIAL CO., LTD., trade name: "NOCRAC MB"

(Preparation of Insulated Wire)

The components for Examples 1 to 7 and Comparative Examples 1 to 5 in the amounts indicated in Tables 1 and 2 were mixed and kneaded at 200 to 230 degrees C. with the use of a twin-screw extruder. Conductors having a cross-sectional area of 0.5 mm$^2$, each of which consisted of a stranded wire, were extrusion-coated with thus-prepared compositions, and insulation coats having a thickness of 0.3 mm were formed around the conductors. A dice having a diameter of 1.3 mm and a nipple having a diameter of 0.9 mm were used for the extrusion formation. The temperature for extrusion was set at 230 to 250 degrees C. for the dice and 230 to 250 degrees C. for a cylinder, and the extrusion formation was performed at a linear speed of 50 to 700 m/min. Thus, insulated wires were prepared. Tests for flame retardancy, productivity, wear resistance, tensile elongation, flexibility, chemical resistance, heat resistance and coordination were carried out on the insulated wires.

[Flame Retardancy]

A flame retardancy test was carried out in accordance with the ISO 6722. An insulated wire that was extinguished within 30 seconds was regarded as excellent. An insulated wire that was extinguished within 70 seconds was regarded as passed. An insulated wire that was not extinguished within 70 seconds was regarded as failed.

[Productivity]

The linear speeds were increased/decreased during the extrusion. An insulated wire that could obtain the designed external diameter at a linear speed of 50 m/min or more was regarded as passed. An insulated wire that could obtain the designed external diameter at a linear speed of 500 m/min or more was regarded as excellent. An insulated wire that could not obtain the designed external diameter at a linear speed of 50 m/min or more was regarded as failed.

[Wear Resistance]

A wear resistance test was carried out in accordance with the ISO 6722. An insulated wire that could resist blade reciprocation of 300 times or more was regarded as passed. An insulated wire that could not resist the blade reciprocation of 300 times or more was regarded as failed. An insulated wire that could resist blade reciprocation of 500 times or more was regarded as excellent.

[Tensile Elongation]

The measurements of tensile elongation of the insulated wires were obtained by a tensile test in accordance with the JIS D608. To be specific, the insulated wires were cut to a length of 100 mm, and the conductors were removed therefrom, and thus tubular test pieces including only the insulation coating members were obtained. Then, at a room temperature of 23±5 degrees C., both the ends of each test piece were attached to chucks of a tensile tester and were pulled at a tensile speed of 200 mm/min, and the load and elongation at the time of break of each test piece were measured. An insulated wire having a tensile elongation of 125% or more was regarded as passed. An insulated wire having a tensile elongation of 300% or more was regarded as excellent.

[Flexibility]

Figure 1A:
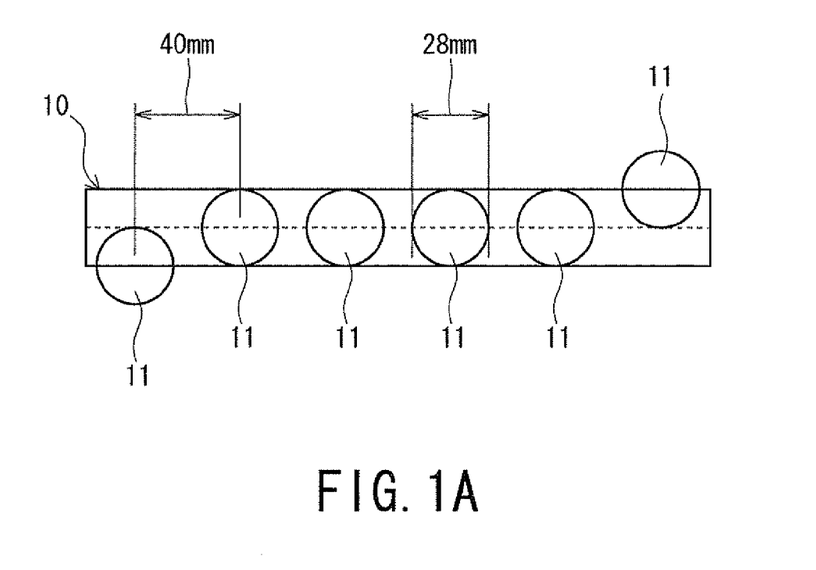
FIGS. 1A and 1B are explanatory views schematically showing a flexibility tester, where an electric wire is yet to be attached in FIG. 1A, and an electric wire is attached in FIG. 1B.
Figure 1B:
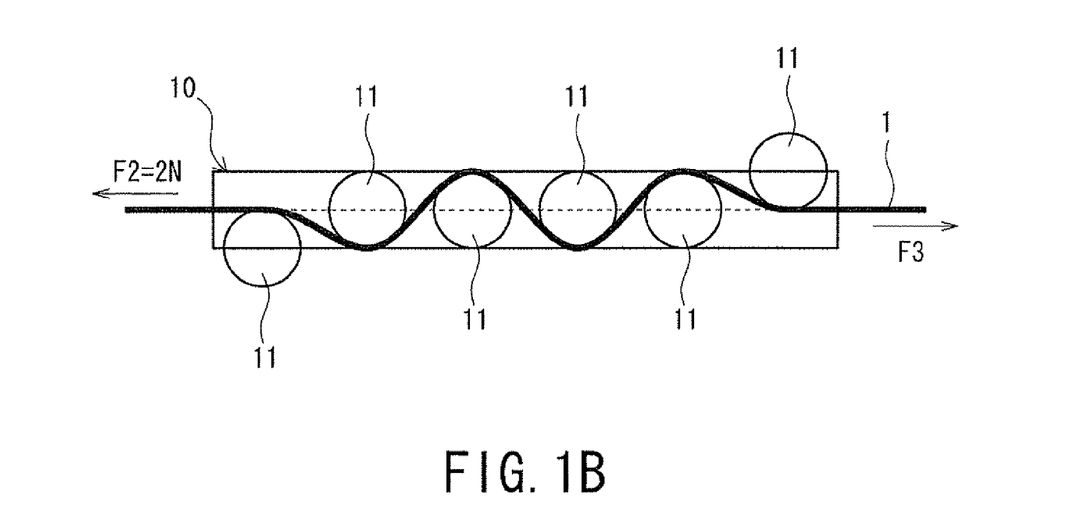

A flexibility tester 10 including six guide rollers 11 having a diameter of 28 mm that were disposed at intervals of 40 mm as shown in FIG. 1A was used. An electric wire 1 was put through between the rollers 11 in a zigzag pattern as shown in FIG. 1B. A force of 2N (F2) was applied to the electric wire, and the electric wire was pulled at a speed of 50 mm/min. When a tensile force (F1) became constant, the tensile force of the electric wire in a length of 125 mm was measured. An aramid roving was pulled through in the tester at a speed of 50 mm/min in order to find a resistance of the tester, whereby a tensile force (F3) was measured. A tensile force (F) necessary to pull the electric wire through in the tester was obtained from the following mathematical expression. The tensile force (F) defines an index that indicates flexibility. As the numeric value of the tensile force (F) is smaller, the electric wire has higher flexibility. An insulated wire having a tensile force F of 3.5 N or less was regarded as passed. An insulated wire having a tensile force F of 2.3 N or less was regarded as excellent. An insulated wire having a tensile force F more than 3.5 N was regarded as failed. $F=F1-F2-F3$

[Chemical Resistance]

Tests of resistance to chemical agents (referred to also as test solutions) of eleven kinds in total that belong to groups 1 and 2 shown below were carried out. An insulated wire that passed all the tests was regarded as passed. An insulated wire that passed none of the tests was regarded as failed. To be specific, the tests were carried out in the following manner. The electric wires of 600 mm were bent so as to have the shape of the letter "U" with the use of a mandrel of 6 mm in diameter, and thus test specimens were prepared. A two-third portion of each specimen was soaked in the chemical agents for ten seconds, and the specimens were taken out of the chemical agents and set aside to make the agent drops fall. Then, the specimens were put in constant-temperature baths at the temperatures and for the times indicated below. Then, the specimens were taken out of the constant-temperature baths, and winding tests described below were carried out. The electric wires were soaked in the test solutions such that the portions of electric wires where the insulation coats were removed were not in contact with the test solutions. The test specimens that were obtained from one electric wire or electric wires of a same kind were not put in a same constant-temperature bath.

Eight test specimens were soaked in the test solutions of group 1, put in the constant-temperature baths at 20±3 degrees C., and then taken out of the baths after two hundred forty hours later. Then, the winding tests (after two hundred forty hours) were carried out on two of the test specimens. The other six test specimens were soaked in the test solutions similarly to the first two test specimens, put again in the constant-temperature baths, and then taken out of the baths after two hundred forty hours later. Then, the winding tests (after four hundred eighty hours) were carried out on two of the six test specimens. The four of the six test specimens were soaked in the test solutions similarly to the first two test specimens, put again in the constant-temperature baths, and then taken out of the baths after two hundred forty hours. Then, the winding tests (after seven hundred twenty hours) were carried out on two of the four test specimens. The last two test specimens were soaked in the test solutions similarly to the first two test specimens, put again in the constant-temperature baths, and then taken out of the baths after two hundred forty hours. Then, the winding tests (after nine hundred sixty hours) were carried out on the two test specimens.

Two test specimens were soaked in the test solutions of group 2 similarly to group 1, and put in the constant-temperature baths at 20±3 degrees C. for three hundred sixty hours. Then, the winding tests were carried out on the two test specimens.

[Test Solutions of Group 1]

The percentages of components of the test solutions define volume percentages unless otherwise indicated.

(1-a) Coolant; 50% of ethylene glycol+50% of distilled water (1-b) Engine oil; ISO 1817 oil No. 2

(1-c) Salt water; 5% of NaCl+95% (mass %) of water (1-d) Window washing solution; 50% of isopropanol+50% of water
[Test Solutions of Group 2]
(2-a) Gasoline; ISO 1817 liquid C
(2-b) Diesel oil; 90% of ISO 1817 oil No. 3+10% of p-xylene
(2-c) Ethanol; 85% of ethanol+15% of ISO 1817 liquid C
(2-d) Power steering oil; ISO 1817 oil No. 3
(2-e) Transmission oil; DEXRON II
(2-f) Brake oil; SAE RM-66-05
(2-g) Electrolyte; 25% of sulfuric acid+75% of water (concentration of 1.28)

The winding tests were carried out as follows after the test specimens were taken out of the constant-temperature baths. The test specimens were taken out of the constant-temperature baths after the lapse of the given times, and put aside at a room temperature (23±5 degrees C.) for thirty minutes. Then, the winding tests were carried out on the test specimens. A middle portion of each of the test specimens was wound around the mandrel (6 mm in diameter), and visual observations of the insulation coats were made. The insulated wires whose conductors were not exposed were subjected to a withstand voltage test (1 kv). An insulated wire having no insulation breakdown was regarded as passed. An insulated wire having an insulation breakdown was regarded as failed.

[Heat Resistance]

An aging test was carried out on the insulated wires in accordance with the ISO 6722 at 100 degrees C. for 3000 hours, or at 125 degrees C. for 3000 hours, and then a withstand voltage test of 1 kv×1 minute was carried out on each of the insulated wires. An insulated wire that stood the aging test at 100 degrees C. was regarded as passed. An insulated wire that stood the aging test at 125 degrees C. was regarded as excellent. An insulated wire that could not stand the aging test at 100 degrees C. was regarded as failed.

[Coordination (PVC Coordination Test)]

Wiring harnesses, each of which defined a mixed wire bundle that was composed of an arbitrary number of test specimens of the insulated wires and an arbitrary number of vinyl chloride insulated wires, and covered with a vinyl chloride adhesive tape, were subjected to heat aging at 150 degrees C. for two hundred forty hours. Then, arbitrary one of the test specimens of the insulated wires was taken out of the mixed wire bundle and coiled to its diameter to make a visual observation of appearance of the test specimen. An insulated wire of which a conductor is not exposed from an insulation coat was regarded as passed. An insulated wire of which a conductor is exposed from an insulation coat was regarded as failed.

TABLE 1

| | No. | Component | Example 1 | Example 2 | Example 3 | Example 4 | Example 5 | Example 6 | Example 7 |
|---|---|---|---|---|---|---|---|---|---|
| Component composition (parts by mass) | 1 | PP1 | — | 90 | — | — | — | — | — |
| | 2 | PP2 | 70 | — | — | — | — | — | 80 |
| | 3 | PP3 | — | — | 50 | — | — | 65 | — |
| | 4 | PP4 | — | — | — | 60 | 70 | — | — |
| | 5 | Olefin elastomer 1 | 20 | — | — | — | 20 | 10 | — |
| | 6 | Olefin elastomer 2 | — | 10 | — | — | — | — | — |
| | 7 | Olefin elastomer 3 | — | — | — | 40 | — | — | 10 |
| | 8 | Olefin elastomer 4 | — | — | 50 | — | — | — | — |
| | 9 | Styrene eastomer 1 | — | — | — | — | — | — | 10 |
| | 10 | Styrene elastomer 2 | — | — | — | — | — | 10 | — |
| | 11 | Maleic-acid modified styrene elastomer | 10 | — | — | — | 10 | — | — |
| | 12 | Amino-acid modified styrene elastomer | — | — | — | — | — | 15 | — |
| | 13 | Maleic-acid modified polyolefin | — | — | — | 10 | — | — | — |
| | 14 | Bromine flame retardant 1 | 20 | — | — | — | 20 | — | — |
| | 15 | Bromine flame retardant 2 | — | 30 | — | 25 | — | — | 20 |
| | 16 | Bromine flame retardant 3 | — | — | 20 | — | — | 8 | — |
| | 17 | Antimony trioxide | 10 | 2 | 1 | 15 | 10 | 10 | 8 |
| | 18 | Magnesium hydroxide | 30 | 70 | 50 | 10 | 50 | 70 | 20 |
| | 19 | Hindered phenolic antioxidant 1 | 3 | — | 1 | — | 3 | — | — |
| | 20 | Hindered phenolic antioxidant 2 | — | 5 | — | 3 | — | 5 | 4 |
| | 21 | Copper inhibitor | 1 | 1 | 1 | 1 | 1 | — | 1 |
| | 22 | Zinc oxide | — | 5 | 10 | — | — | 1 | 3 |
| | 23 | Zinc sulfide | 10 | — | — | 15 | 10 | 3 | — |
| | 24 | Mercaptobenzimidazole 1 | — | 5 | — | — | — | — | 2 |
| | 25 | Mercaptobenzimidazole 2 | — | — | 10 | — | — | — | — |
| | | Total | 174 | 218 | 193 | 179 | 194 | 197 | 158 |
| Test result | | Flame retardancy | Excellent | Excellent | Passed | Excellent | Excellent | Passed | Excellent |
| | | Productivity | Excellent | Passed | Excellent | Excellent | Excellent | Excellent | Excellent |
| | | Wear resistance | Passed | Passed | Passed | Passed | Passed | Passed | Passed |
| | | Tensile elongation | Excellent | Excellent | Excellent | Excellent | Excellent | Excellent | Excellent |
| | | Flexibility | Excellent | Passed | Excellent | Excellent | Excellent | Excellent | Excellent |
| | | Chemical resistance | Passed | Passed | Passed | Passed | Passed | Passed | Passed |
| | | Heat resistance | Excellent | Excellent | Passed | Passed | Excellent | Passed | Excellent |
| | | Coordination | Passed | Passed | Passed | Passed | Passed | Passed | Passed |

TABLE 2

| | No. | Component | Comparative Example 1 | Comparative Example 2 | Comparative Example 3 | Comparative Example 4 | Comparative Example 5 |
|---|---|---|---|---|---|---|---|
| Component composition (parts by mass) | 1 | PP1 | — | 50 | — | — | — |
| | 2 | PP2 | 70 | — | — | — | — |
| | 3 | PP3 | — | — | 100 | — | — |
| | 4 | PP4 | — | — | — | — | 70 |
| | 5 | Olefin elastomer 1 | 20 | — | — | — | 20 |
| | 6 | Olefin elastomer 2 | — | 50 | — | — | — |
| | 7 | Olefin elastomer 3 | — | — | — | 100 | — |
| | 8 | Olefin elastomer 4 | — | — | — | — | — |
| | 9 | Styrene eastomer 1 | — | — | — | — | — |
| | 10 | Styrene elastomer 2 | — | — | — | — | — |
| | 11 | Maleic-acid modified styrene elastomer | 10 | — | — | — | 10 |
| | 12 | Amino-acid modified styrene elastomer | — | — | — | — | — |
| | 13 | Maleic-acid modified polyolefin | — | — | — | 10 | — |
| | 14 | Bromine flame retardant 1 | — | — | — | — | 20 |
| | 15 | Bromine flame retardant 2 | — | 5 | — | 100 | — |
| | 16 | Bromine flame retardant 3 | — | — | 20 | — | — |
| | 17 | Antimony trioxide | — | 5 | 1 | 15 | 10 |
| | 18 | Magnesium hydroxide | 30 | — | 50 | 10 | 50 |
| | 19 | Hindered phenolic antioxidant 1 | 3 | — | 1 | — | — |
| | 20 | Hindered phenolic antioxidant 2 | — | 5 | — | 3 | — |
| | 21 | Copper inhibitor | 1 | 1 | 1 | 1 | — |
| | 22 | Zinc oxide | — | 5 | 10 | — | — |
| | 23 | Zinc sulfide | 10 | — | — | 15 | — |
| | 24 | Mercaptobenzimidazole 1 | — | 5 | — | — | — |
| | 25 | Mercaptobenzimidazole 2 | — | — | 10 | — | — |
| | | Total | 144 | 126 | 193 | 254 | 180 |
| Test result | | Flame retardancy | Failed | Failed | Passed | Excellent | Excellent |
| | | Productivity | Excellent | Excellent | Excellent | Failed | Excellent |
| | | Wear resistance | Passed | Passed | Passed | Failed | Passed |
| | | Tensile elongation | Excellent | Excellent | Passed | Passed | Excellent |
| | | Flexibility | Excellent | Excellent | Failed | Excellent | Excellent |
| | | Chemical resistance | Passed | Passed | Passed | Failed | Passed |
| | | Heat resistance | Excellent | Passed | Excellent | Failed | Failed |
| | | Coordination | Passed | Passed | Passed | Passed | Failed |

As is evident from Tables 1 and 2, the composition of Comparative Example 1 does not contain a bromine flame retardant while the composition of Example 1 contains. For this reason, the composition of Comparative Example 1 is inferior in flame retardancy.

The composition of Comparative Example 2 does not contain magnesium hydroxide. For this reason, the composition of Comparative Example 2 is inferior in flame retardancy.

The composition of Comparative Example 3 does not contain an olefin elastomer. For this reason, the composition of Comparative Example 3 is inferior in flexibility.

The composition of Comparative Example 4 does not contain polypropylene. For this reason, the composition of Comparative Example 4 is inferior in heat resistance, wear resistance, productivity and chemical resistance.

The composition of Comparative Example 5 does not contain zinc sulfide, zinc oxide nor mercaptobenzimidazole. For this reason, the composition of Comparative Example 5 is inferior in heat resistance and coordination.

Meanwhile, the compositions of present Examples 1 to 7 are all favorable in all the properties.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

The invention claimed is:

1. An insulated wire comprising a non-crosslinked insulation coat, wherein the non-crosslinked insulation coat is made from a composition comprising:
    (A) a polypropylene;
    (B) a polyolefin elastomer;
    (C) a bromine flame retardant;
    (D) an antimony trioxide;
    (E) magnesium hydroxide;
    (F) at least one of (i) and (ii):
        (i) (F1) a zinc sulfide,
        (ii) a combination of (F2) a zinc oxide and (F3) mercaptobenzimidazole; and
    (G) a hindered phenolic antioxidant,
    wherein:
        each of (A) the polypropylene and (B) the polyolefin elastomer is not modified by a functional group or a silane coupling agent, and
        a total content of (A) the polypropylene and (B) the polyolefin elastomer is 45 wt % or more of the composition.

2. The insulated wire according to claim 1, wherein the compositon further any one of:
    (H1) a functional-group modified styrene elastomer that is modified by a functional group;
    (H2) a functional-group modified polyolefin that is modified by a functional group; and
    (H1) the functional-group modified styrene elastomer and (H2) the functional-group modified polyolefin, wherein each of the functional groups comprises one or a plurality of functional groups selected from the group consisting of a carboxylic acid group, an acid anhydride group, an amino group, and an epoxy group.

3. The insulated wire according to claim 2, wherein (C) the bromine flame retardant comprises one or a plurality of bromine flame retardants selected from the group consisting of ethylenebis (pentabromobenzene), bis(tetrabromophthalimide)ethane, and tetrabromobisphenolA bis(dibromopropylether).

4. The insulated wire according to claim 3, wherein:
(A) the polypropylene has a flexural modulus of 800 to 2000 MPa, and a melt flow rate at 230 degrees C. of 0.5 to 5 g/10 min, and
(B) the polyolefin elastomer has a flexural modulus less than 300 MPa, and a melt flow rate at 230 degrees C. of 1 g/10 min or more.

5. The insulated wire according to claim 4 having an external diameter of 4 mm or less.

6. A wiring harness comprising the insulated wire according to claim 5.

7. The insulated wire according to claim 2 having an external diameter of 4 mm or less.

8. A wiring harness comprising the insulated wire according to claim 7.

9. The insulated wire according to claim 1 having an external diameter of 4 mm or less.

10. A wiring harness comprising the insulated wire according to claim 9.

11. The composition according to claim 1, wherein (C) the bromine flame retardant comprises one or a plurality of bromine flame retardants selected from the group consisting of ethylenebis (pentabromobenzene), bis(tetrabromophthalimide)ethane, and tetrabromobisphenolA bis(dibromopropylether).

12. The insulated wire according to claim 11 having an external diameter of 4 mm or less.

13. A wiring harness comprising the insulated wire according to claim 12.

14. The composition according to claim 1, wherein:
(A) the polypropylene has a flexural modulus of 800 to 2000 MPa, and a melt flow rate at 230 degrees C. of 0.5 to 5 g/10 min, and
(B) the polyolefin elastomer has a flexural modulus less than 300 MPa, and a melt flow rate at 230 degrees C. of 1 g/10 min or more.

15. The insulated wire according to claim 14 having an external diameter of 4 mm or less.

16. A wiring harness comprising the insulated wire according to claims 15.

17. The insulated wire according to claim 1, wherein in the compostion:
the content of (A) the polypropylene is 50 to 90 parts by mass;
the content of (B) the polyolefin elastomer is 10 to 50 parts by mass;
the content of (C) the bromine flame retardant is 10 to 30 parts by mass with respect to 100 parts by mass of the total content of the (A) and (B) components;
the content of (D) the antimony trioxide is 1 to 20 parts by mass with respect to 100 parts by mass of the total content of the (A) and (B) components;
the content of (E) the magnesium hydroxide is 10 to 90 parts by mass with respect to 100 parts by mass of the total content of the (A) and (B) components;
the content of (F2) the zinc oxide is 1 to 15 parts by mass, and the content of (F3) the mercaptobenzimidazole is 2 to 15 parts by mass with respect to 100 parts by mass of the total content of the (A) and (B) components; and
the content of (G) the hindered phenolic antioxidant is 1 to 10 parts by mass with respect to 100 parts by mass of the total content of the (A) and (B) components.

* * * * *